United States Patent
Haimer (10) Patent No.: US 12,479,054 B2
(45) Date of Patent: Nov. 25, 2025

(54) APPLIANCE FOR HEAT TREATMENT AND METHOD FOR OPERATING THE APPLIANCE

(71) Applicant: Franz Haimer Maschinenbau KG, Igenhausen (DE)

(72) Inventor: Franz Haimer, Igenhausen (DE)

(73) Assignee: Franz Haimer Maschinenbau KG, Igenhausen (DE)

( * ) Notice: Subject to any disclaimer, the term of this patent is extended or adjusted under 35 U.S.C. 154(b) by 795 days.

(21) Appl. No.: 17/686,635

(22) Filed: Mar. 4, 2022

(65) Prior Publication Data

US 2022/0281015 A1    Sep. 8, 2022

(30) Foreign Application Priority Data

Mar. 5, 2021 (DE) ...................... 10 2021 105 345.5
Dec. 7, 2021 (DE) ...................... 10 2021 132 211.1

(51) Int. Cl.
  *H05B 6/14*  (2006.01)
  *B23P 11/02*  (2006.01)
  (Continued)

(52) U.S. Cl.
  CPC .............. *B23P 11/027* (2013.01); *C21D 1/42* (2013.01); *H05B 6/14* (2013.01); *B23B 31/1179* (2013.01)

(58) Field of Classification Search
  CPC ...... B23B 31/1179; B23P 11/027; C21D 1/42; H05B 6/14
  (Continued)

(56) References Cited

U.S. PATENT DOCUMENTS 4,855,556 A * 8/1989 Mucha ..................... C21D 9/32
                                                    219/653
7,902,487 B2 * 3/2011 Mistry .................. G01B 7/282
                                                    324/207.13
(Continued)

FOREIGN PATENT DOCUMENTS

CN         101956056 A  *  1/2011
DE     102012216186 A1     3/2014
(Continued)

OTHER PUBLICATIONS

Translation of DE102018121883A1, "Shrink-fit Device and Method for Inductively Heating Shrink-Fit Chucks", Mar. 12, 2020, By Wipo (Year: 2020).*

*Primary Examiner* — Quang T Van
(74) *Attorney, Agent, or Firm* — Laurence A. Greenberg; Werner H. Stemer; Ralph E. Locher (57) ABSTRACT

An appliance for heat treatment or inductive heating or cooling of shrink chucks for shaft-type tools or a shrinkage appliance or cooling appliance or shrinkage appliance with a cooling appliance, includes a receiving device or opening receiving a shrink chuck, a heat treatment unit surrounding the receiving device relative to a central axis, an induction coil arrangement or cooling unit, and a measuring unit for temperature measurement of the shrink chuck. For exactly measuring shell temperatures of chucks in receiving openings, the measuring unit has temperature sensors around the receiving device or one temperature sensor inclined around the central axis for contactless detection of the shell temperature, or the measuring unit has sensors around the receiving device including a first temperature sensor for contactless detection of a shell temperature, and a different type of second sensor for detecting another property of the shrink chuck in the receiving device.

21 Claims, 8 Drawing Sheets

(51) Int. Cl.
  *C21D 1/42* (2006.01)
  *B23B 31/117* (2006.01)
(58) Field of Classification Search
  USPC ....... 219/635, 639, 640, 641, 672, 674, 676,
   219/677; 156/572, 673; 148/572, 673
  See application file for complete search history.

(56) References Cited

U.S. PATENT DOCUMENTS

| | | |
|---|---|---|
| 11,141,797 B2 | 10/2021 | Haimer |
| 2021/0197291 A1* | 7/2021 | Diebold .................. H05B 3/40 |

FOREIGN PATENT DOCUMENTS

| | | | |
|---|---|---|---|
| DE | 102018121883 A1 | 3/2020 | |
| EP | 3444064 A1 | 2/2019 | |

* cited by examiner

APPLIANCE FOR HEAT TREATMENT AND METHOD FOR OPERATING THE APPLIANCE

CROSS-REFERENCE TO RELATED APPLICATION

This application claims the priority, under 35 U.S.C. § 119, of German Patent Application Nos. DE 10 2021 105 345.5, filed Mar. 5, 2021, and DE 10 2021 132 211.1, filed Dec. 7, 2021; the prior applications are herewith incorporated by reference in their entirety.

FIELD AND BACKGROUND OF THE INVENTION

The invention relates to an appliance for heat treatment, in particular for inductive heating or cooling, of shrink chucks for shaft-type tools, in particular a shrinkage appliance or a cooling appliance or a shrinkage appliance with a cooling appliance (for shrink chucks). The invention furthermore relates to a method for operating such an appliance.

Such an appliance for heat treatment of shrink chucks, in that case a shrinkage appliance, is known from German Application DE 10 2012 216 186 A1. The shrinkage appliance provides a sensor-based temperature measuring device, in that case a radiation/IR thermometer, which contactlessly detects a shell temperature or surface temperature of a shrink chuck and which is positioned in a static manner at a distance on the shrinkage appliance. In order to provide the temperature measurement, however, an induction coil arrangement of the shrinkage appliance must be moved out of the range of engagement with the shrink chuck, so that the shrink chuck surface can be sensed by the sensor. A temperature measurement is thus not possible during a heating operation.

It is sought to achieve an improvement in that regard by way of a further such shrinkage appliance with an induction coil arrangement and with a sensor-based temperature measurement device which performs detection contactlessly, as is known from DE 10 2018 121 883 A1, corresponding to U.S. Publication No. 2021/0197291. In the case of that shrinkage appliance, provision is made for a measurement channel to extend through the induction coil arrangement, which measurement channel opens into a receiving opening for receiving a shrink chuck. Furthermore, the shrinkage appliance then provides for the sensor-based temperature measuring device, which performs detection contactlessly, to have a temperature sensor, in that case likewise a radiation thermometer, for the detection of the shell temperature of the shrink chuck that engages into the measurement channel.

Those radiation thermometers used therein in the cited prior art (for the contactless temperature measurement in the case of shrink chucks) operate on the basis of infrared radiation/thermal radiation emitted by the body (such as the infrared radiation/thermal radiation emitted there by a shrink chuck).

Any body or any object emits a quantity of infrared radiation or thermal radiation that corresponds to its surface temperature (which radiation is detected by using a radiation thermometer and is evaluated). In that case, the intensity of the infrared radiation/thermal radiation changes in a manner dependent on the object temperature.

Furthermore, the intensity of the infrared radiation/thermal radiation of "real bodies" is however also dependent on the material and surface. That is to say, (real) bodies radiate with an intensity that is lower, by a material-dependent/surface-dependent factor, than that of ideal thermal radiators, that is to say ideal "black radiators." That factor is referred to as "emissivity $\varepsilon$."

For contactless temperature measurement, it is thus necessary, if one wishes to exactly measure the temperatures of individual bodies, to know the (individual) emissivity $\varepsilon$, that is to say the heat-radiating capability, of the respective body.

Exactly that proves to be disadvantageous in the case of known shrinkage appliances with radiation thermometers used therein, where it is sought to measure the temperature on (many different) real bodies, that is to say the shrink chucks, which have emissivities $\varepsilon$ that are in practice not known.

Normally, the radiation thermometer that is used is therefore preset (or calibrated) to a particular emissivity $\varepsilon$. That is to say, the exact temperature measurement can be performed only for a very particular body with a very particular material/surface (specifically for the body having a material/surface which has exactly the preset emissivity $\varepsilon$), which leads to measurement errors in the case of all other bodies (or shrink chucks) that are to be measured—which have other, different emissivities $\varepsilon$.

SUMMARY OF THE INVENTION

It is accordingly an object of the invention to provide an appliance for heat treatment and a method for operating the appliance, which overcome the hereinafore-mentioned disadvantages of the heretofore-known appliances and methods of this general type and which improve the shrinkage appliances known in the prior art, or in general known appliances for a heat treatment of shrink chucks, with regard to their temperature measurement on the shrink chucks for treatment, and to (thus) ensure a reliable heat treatment, in particular heating or cooling of shrink chucks, with a high level of safety and ease of handling.

The object is achieved by using an appliance for a heat treatment, in particular for inductive heating or cooling, of shrink chucks, and by using a method for operating such an appliance, having the features of the respective independent claim.

Advantageous refinements of the invention are the subject of dependent claims and the following description, and relate both to the appliance or the appliances and to the method.

Terms such as up, down, front, rear, left or right, are to be understood in accordance with conventional understanding unless explicitly defined otherwise. Expressions such as radial and axial are to be understood in relation to a central axis of the appliance.

The expression "substantially," where used, may be understood as meaning "to a practically still significant degree." Possible deviations from exactness that are thus implied by this term may arise unintentionally (that is to say without any functional basis) due to manufacturing or assembly tolerances or the like.

With the foregoing and other objects in view there is provided, in accordance with the invention, an appliance for heat treatment, in particular for inductive heating or cooling, of shrink chucks for shaft-type tools, in particular a shrinkage appliance or a cooling appliance or a shrinkage appliance with a cooling appliance (for shrink chucks), comprising a receiving device, which forms a receiving region for a shrink chuck and which is in particular a receiving opening, for receiving the shrink chuck, a heat treatment unit which in particular concentrically surrounds the receiving device or the receiving region with respect to a central axis, in particular an induction coil arrangement or a cooling unit, and a measuring unit for in particular contactless temperature measurement of the shrink chuck.

Such a temperature measuring unit, which preferably performs measurements contactlessly, may for example be a measuring unit that is based on the measurement of (thermal) radiation of bodies. That is to say, such a temperature measurement unit, which preferably performs measurements contactlessly, may for example have a radiation sensor, for example in the case of a pyrometer.

Furthermore, in the case of the appliance according to the invention, provision is made for the measuring unit to have multiple temperature sensors which are disposed around the receiving device or the receiving region—or at least one temperature sensor which is disposed around the receiving device or receiving region and which is inclined with respect to the central axis, for the in particular contactless detection of a shell temperature or surface temperature of a shrink chuck disposed in the receiving device/in the receiving region, for example a radiation sensor or radiation sensors or a pyrometer with a radiation sensor or pyrometer with radiation sensors.

In other words, it is expedient if each of the multiple temperature sensors and/or the inclined temperature sensor are configured as a radiation detector, in particular as a pyrometer with a radiation detector for detecting thermal radiation from a shrink chuck disposed in the receiving device.

In this case, the at least one inclined temperature sensor may also be one of the multiple temperature sensors disposed around the receiving device or receiving region.

It is preferable if an inclination angle of the inclined temperature sensor is between 30° and 60°, in particular 45°.

Inclination of the sensor makes it possible, in particular in a region in which it is sought to perform measurement and/or monitor the surface temperature, for example in the range from 50° C.-70° C., to better detect the surface by way of an emissivity $\varepsilon$.

Furthermore, inclination of the temperature sensor makes it possible to realize a larger detectable region that can be monitored by the temperature sensor.

In particular, it may also be expedient if at least one of the multiple temperature sensors and/or the inclined temperature sensor provides a focusing device and/or a shielding device, in particular an aperture.

In this way, or by using such a focusing device and/or shielding device, it can be achieved that the temperature sensor is insensitive (less sensitive) to interference radiation, for example from a thermal-radiation-emitting appliance that is disposed close to the temperature sensor, for example a shrinkage appliance. It may thus be possible to dispense with additional shields for the temperature sensor.

It may then preferably also be provided in this case that at least two, in particular many or even all, of the multiple temperature sensors are taken into consideration jointly for the measurement of the shell temperature or surface temperature of a shrink chuck disposed in the receiving device/in the receiving region.

"Taken into consideration" may mean in particular that a resulting shell temperature or surface temperature is ascertained using at least two, in particular many or even all of the temperature sensors, or the measurements/measured values thereof. A first, simplest approach in this regard could be for an average value to be determined as a resulting shell temperature from the at least two temperature sensors, in particular from many or even all of the temperature sensors, or from the measurements/measured values thereof. In this case, it is also possible for the individual temperature sensors or the measurements/measured values thereof to each be individually weighted.

Provision may thus also be made in this case for at least two, in particular many or even all, of the temperature sensors to have different configurations/measurement settings.

"Different configurations/measurement settings" (in the case of the temperature sensors) may be understood in particular to mean that the temperature sensors are differently calibrated, for example for different materials/surfaces of shrink chucks (or different emissivities $\varepsilon$). This may also mean that the temperature sensors have measurement ranges in different wavelength ranges (compare quotient pyrometer).

Alternatively, in the case of the appliance according to the invention, it is also provided that the measuring unit has multiple sensors disposed around the receiving device or the receiving region, at least a first of the sensors being a temperature sensor for in particular contactless detection of a shell temperature of a shrink chuck disposed in the receiving device/in the receiving region, for example a radiation sensor or a pyrometer with radiation sensor (see above), and at least a second of the sensors being a sensor of different type for detection of another property of the shrink chuck disposed in the receiving device/in the receiving region.

In this case, the at least one inclined sensor may also be the at least one first temperature sensor, which is combined with the at least one second sensor of different type.

The at least one first temperature sensor may also have a focusing device and/or a shielding device.

The at least one second sensor of different type may preferably be a distance sensor, which in particular performs measurement contactlessly, or a reflection sensor, in particular an optical sensor or an ultrasound sensor or a laser sensor or an infrared (reflection) sensor.

Distance sensors, also referred to as position sensors, travel sensors, travel transducers or distance sensors, measure a distance between the sensor and an object. Distance sensors can be used to measure variables such as distance, travel and position. The change in the distance is converted by the sensor or by a sensor controller into an electrical signal, which can be output—optionally through various interfaces—to a control unit.

Using a reflection sensor, the presence or absence of an object is checked by measuring the light reflection on the object.

The temperature measurement can be improved if several of the first temperature sensors and/or several of the second sensors of different type are disposed around the receiving device/around the receiving region. In this case, the multiple second sensors of different type may in turn also be of different type than one another, for example a distance sensor combined with a reflection sensor.

Furthermore, provision may also be made in this case—in the case of several of the first temperature sensors—for at least two, in particular many or even all, of the first temperature sensors to have different configurations/measurement settings.

As an alternative to the case of multiple radiation sensors, the signal from one and the same radiation sensor may be evaluated in different ways, for example on the basis of different emissivities $\varepsilon$, instead of using multiple temperature sensors with different configurations/measurement settings.

Provision may then preferably also be made for at least the at least one first temperature sensor and the at least one second sensor of different type, in particular—in the case of several of each of these—several, many or even all of this first temperature sensor and of this second sensor of different type, to be used for the measurement of the shell temperature or surface temperature of a shrink chuck disposed in the receiving device/in the receiving region.

In a refinement, provision may also be made for the sensors to be disposed in circular form (optionally in groups on different circles) with respect to the central axis and/or at different axial heights with respect to the central axis at or around the receiving device/receiving region. This may be realized with a uniform pitch or with a non-uniform pitch.

In this case, provision may also be made for each sensor to be fastened individually at its predetermined position, for example in or on the heat treatment unit, or on a housing thereof, or for a common holding device, for example a ring-shaped structural unit (measuring ring) which at least partially surrounds the receiving device/the receiving region, to be provided, which structural unit or measuring ring receives the sensors and is then in turn installed in the appliance or in or on the heat treatment unit/housing.

In this case, the substantially ring-shaped structural unit or the measuring ring may preferably be disposed coaxially with respect to the central axis in the appliance, in particular axially adjacent to the heat treatment unit, in particular the induction coil arrangement or the cooling unit.

It may also be expedient if, of the sensors, sensors of the same type are disposed adjacently in the substantially ring-shaped structural unit, for example so as to be "bundled" in (circular) sectors. For example, the temperature sensors may be disposed adjacent to one another in one circular sector of the substantially ring-shaped structural unit or of the measuring ring.

In one refinement, provision may also be made for the heat treatment unit to have, or be extended through by, at least one or more recesses, for example (measurement) channels which open into the receiving region formed by the receiving unit and which are in particular radial.

In the case of an induction coil arrangement as heat treatment unit, it may in particular be expedient if a coil winding of the induction coil arrangement is wound around the channels—so as to leave the respective recess or the respective channel free.

A sensor, such as a temperature sensor, may then be disposed or inserted in such a (measurement) channel or at least partially in such a measurement channel and/or at such a (measurement) channel, specifically so as to perform measurement through the measurement channel.

If the sensor is furthermore also disposed outside a housing of the heat treatment unit, then it is expedient for the housing to provide a corresponding through recess for the sensor (for the sensor to perform measurement through).

In particular, it is expedient—from a measurement aspect—if such a measurement channel runs substantially radially with respect to the central axis through the heat treatment unit and/or the housing thereof.

In a refinement, provision may also be made for such a measurement channel to be disposed in an axial central region of the induction coil arrangement, preferably approximately centrally between the axial ends thereof.

It has furthermore proven to be expedient if a, preferably exchangeable, protective window, which is in particular permeable to thermal radiation, is inserted into such a measurement channel in particular for the purposes of protecting the sensor against contamination and/or damage.

In this regard, too, it may be provided as an alternative or in addition—to the enwound (measurement) channels—that, in the case of an induction coil arrangement as heat treatment unit, the induction coil arrangement has two or more spaced-apart sub-coils, wherein, then, a or the sensors are disposed—correspondingly to the channel arrangement—in the spacings between the sub-coils (and can perform measurement therethrough). A corresponding arrangement may also be provided in the case of a cooling unit, with sub-units, as a heat treatment unit.

Furthermore, the transmission of measured values from the temperature sensors may take place in wired fashion or else wirelessly to a processing and/or control unit.

It has proven to be expedient, in particular for contactless temperature measurement, if the multiple temperature sensors are each configured as radiation detectors/sensors that perform measurement contactlessly, or as pyrometers with a radiation detector/sensor (for detecting thermal radiation from a shrink chuck disposed in the receiving opening).

In the appliance, there may preferably also be provided a processing unit for ascertaining a or the resulting shell temperature of a shrink chuck disposed in the receiving device/receiving region, which processing unit is configured in such a way that the resulting shell temperature can be ascertained using the sensors, in particular using shell temperatures, detected by multiple temperature sensors, of the shrink chuck disposed in the receiving device.

It is also expedient if the appliance is configured with a control unit. The control unit may serve in particular for the control of the heat treatment unit, such as the induction coil arrangement or the cooling unit, for example by virtue of the control unit controlling a power of the heat treatment unit, for example an electrical current supply to the induction coil arrangement, in a manner dependent on the shell temperature ascertained using the sensors.

It may furthermore also be expedient if the appliance has a display device for displaying a thermal state, in particular of a tool receptacle disposed in the receiving device/in the receiving region, in particular of a shrink chuck. These may for example be colored diodes. Different colors can indicate different thermal states.

Proceeding from the problem of different and unknown emissivities $\varepsilon$ in the case of a multiplicity of shrink chucks whose temperatures are to be measured, the invention is based on the consideration that the influence of the emissivity $\varepsilon$ (which is dependent on the material and/or the surface of a respective shrink chuck) can be eliminated or factored out (for example mathematically canceled out) if multiple sensors are used or if temperature measurement is performed by using multiple sensors, in particular multiple temperature sensors or different sensors, and thus the temperature measurement is made independent of the respective emissivity $\varepsilon$, or the knowledge thereof is no longer necessary.

In the case of a single (radiation) sensor for the temperature measurement, the knowledge of the specific emissivity $\varepsilon$ of the respective shrink chuck is necessary (for exact temperature measurement/determination), and the (radiation) sensor would have to be in each case individually set for the emissivity $\varepsilon$, or the (radiation) sensor would have to be individually calibrated for the respective shrink chuck. This is eliminated with multiple temperature sensors in accordance with the invention.

This knowledge is also incorporated into an alternative appliance according to the invention for a heat treatment, in particular for inductive heating or cooling, of shrink chucks for shaft-type tools, in particular a shrinkage appliance or a cooling appliance or a shrinkage appliance with cooling appliance, having a receiving device which forms a receiving region, in particular having a receiving opening, for receiving a shrink chuck, having a heat treatment unit which in particular concentrically surrounds the receiving device with respect to a central axis, in particular an induction coil arrangement or a cooling unit, and having a measuring unit for in particular contactless temperature measurement of the shrink chuck, which appliance provides for the measuring unit to have a quotient pyrometer.

Quotient pyrometers (also referred to as two-color or ratio pyrometers) use two (radiation) detectors which operate at wavelengths that are different but usually close together, and which are directed to the same aim.

The term "ratio pyrometer" is used because two radiation densities of different wavelengths, which are measured on a body, are set in a "ratio" to form a quotient Q, and thus the emissivity ε is eliminated (that is to say it can be canceled out), and all that is left is an expression that is dependent on the temperature. This dependency can be obtained for example from a calibration using a blackbody. Temperatures can then be measured without knowing the emissivity ε.

The quotient pyrometer may preferably also be configured with all of the above-described features, in particular where they can relate to temperature sensors and/or are combinable with such features.

In particular, provision may also be made in this case for the heat treatment unit to have a measurement channel with all of the refining features described above, in which or at which the quotient pyrometer is disposed and through which the quotient pyrometer performs measurements.

The substantially ring-shaped structural unit or the measuring ring may also be equipped with the quotient pyrometer.

In the method for operating an appliance according to the invention, in particular for inductive heating of a shrink chuck or cooling of a shrink chuck, a resulting shell temperature of a shrink chuck disposed in the receiving opening or in the receiving region is then ascertained using the multiple sensors, in particular using shell temperatures, detected by the multiple temperature sensors, of the shrink chuck disposed in the receiving device opening/receiving region.

This may for example be realized by virtue of the temperature sensors having different configurations/measurement settings, for example being differently calibrated, for example for different materials/surfaces of shrink chucks (or different emissivities ε), or by virtue of the temperature sensors having measurement ranges in different wavelength ranges (compare quotient pyrometer), and the resulting shell temperature then being determined from the measurements/measured values ascertained from the multiple temperature sensors.

In other words, it may be provided that different calibrations/settings, in particular different emissivities ε, are set at multiple temperature sensors, and measurements from the multiple temperature sensors are compared and/or jointly processed, and from these the resulting shell temperature is determined.

Mathematically, it can prove in this case to be advantageous in particular that, if the measurements of the multiple temperature sensors are set in a ratio, the emissivity ε can be eliminated.

This may for example also be realized by virtue of a calibration/setting or adjustment at at least one temperature sensor being performed using a measurement from the second sensor of different type, or through the use of a measurement from the second sensor of different type to determine how the resulting shell temperature is determined, in particular from the measurements from multiple temperature sensors.

For example, this would be possible in particular by virtue of the surface (color) of the shrink chuck being ascertained by reflection measurement using a reflection sensor, which is corrected using the measurement from a distance sensor. In a manner dependent on this, it is then possible (a) for presetting to be performed at the or at a temperature sensor and for measurement to then be performed using the temperature sensor, or (b) for the measurements from multiple preset temperature sensors to be correspondingly processed.

It has however also surprisingly been possible to observe that, within the temperature limits and in particular frequency ranges, the emission behavior exhibits only small differences under different surface conditions. It is thus made possible for the temperature to be measured with sufficient accuracy within these temperature limits using a single suitable sensor, for example the temperature sensor or the pyrometer, in particular the single inclined sensor, which operates in an expedient frequency range, irrespective of the surface condition of the shrink chuck.

The operation of the shrinkage appliance may preferably reside in a shrink chuck in the receiving device, which is surrounded by a heat treatment device configured as an induction coil arrangement, being inductively heated and the shrink chuck thus being expanded, and in the heating operation being controlled using the resulting shell temperature.

Alternatively, a shrink chuck in the receiving device, which is surrounded by a heat treatment device configured as a cooling unit, is cooled, and the cooling operation is controlled using the resulting shell temperature.

This control may for example be performed through variation or adaptation and/or control of an electrical current supplied to the heat treatment unit in a manner dependent on the resulting shell temperature.

The above description of advantageous refinements of the invention includes numerous features that are presented in some cases collectively in combination in the individual subclaims. The features may however expediently also be considered individually and combined to form further meaningful combinations.

Even though some terms are used in each case in the singular or in conjunction with a numeral in the description and/or in the patent claims, it is not the intention for the scope of the invention to be restricted to the singular or the respective numeral for the terms. Furthermore, the words "a" or "an" are to be understood not as numerals but as indefinite articles.

The above-described properties, features and advantages of the invention, and the manner in which these are achieved, will become clearer and more clearly understandable in conjunction with the following description of the exemplary embodiments of the invention, which will be discussed in more detail in conjunction with the drawings/figures (identical parts/components and functions are denoted by the same reference designations in the drawings/figures).

The exemplary embodiments serve for the explanation of the invention and do not restrict the invention to the combinations of features, including functional features, specified therein. Furthermore, for this purpose, suitable features of each exemplary embodiment may also explicitly be considered in isolation, taken from one exemplary embodiment, introduced into another exemplary embodiment in order to supplement the latter, and combined with any of the claims.

Other features which are considered as characteristic for the invention are set forth in the appended claims.

Although the invention is illustrated and described herein as embodied in an appliance for heat treatment and a method for operating the appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Shrinkage Appliance with Contactless Temperature Measurement (FIGS. 1 to 4)

Figure 1:
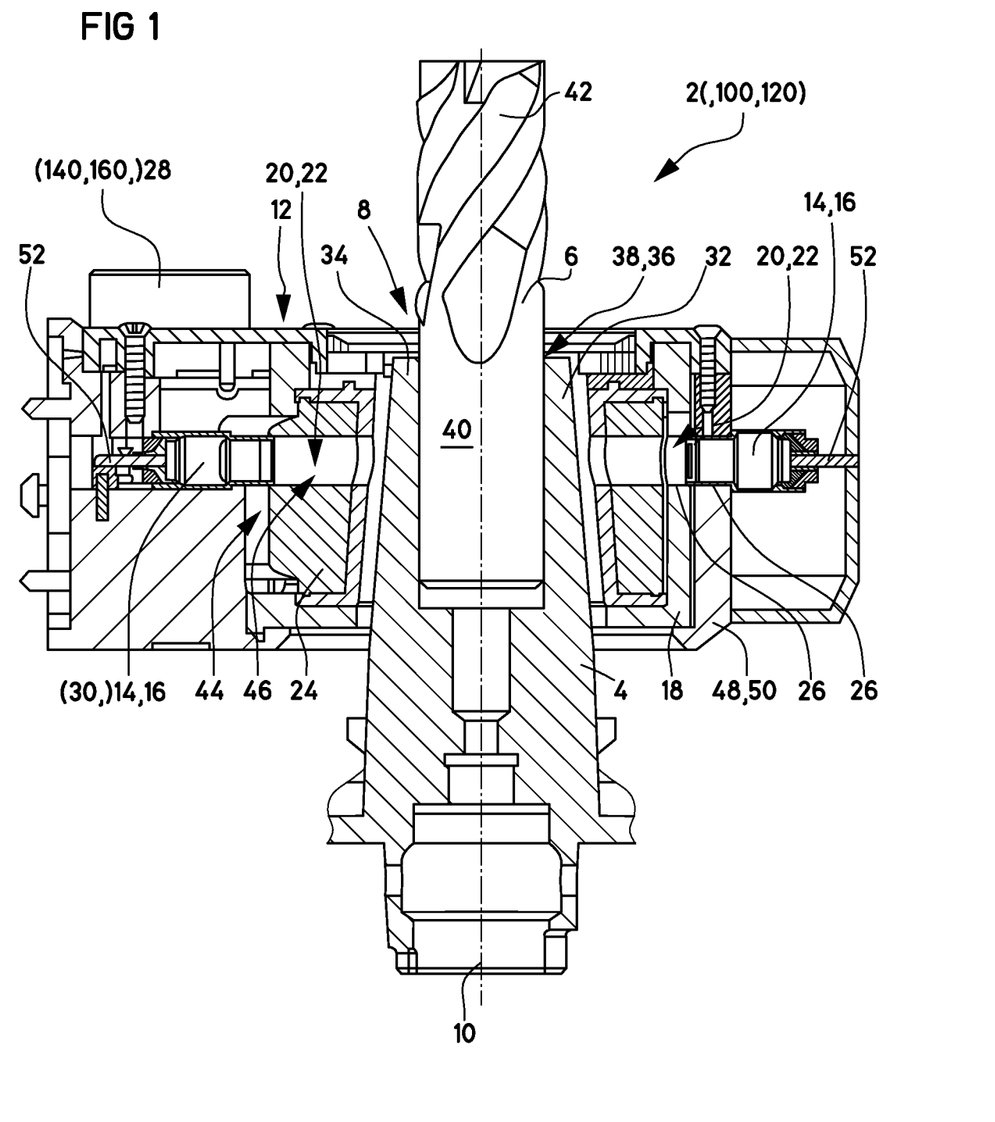
FIG. 1 is a diagrammatic, axial-sectional view of a shrinkage appliance with an induction coil arrangement equipped with multiple temperature sensors that perform measurement contactlessly, according to one embodiment.

Referring now to the figures of the drawings in detail and first, particularly, to FIG. 1 thereof, there is seen a shrinkage appliance 2 for the shrink-fitting or shrinkage-based removal 120 of shaft-type tools 6 or (as shown) of a milling tool 6 into or from a shrink chuck 4, having an induction coil arrangement 12 that is equipped with multiple temperature sensors 16 that perform measurement contactlessly.

Figure 2:
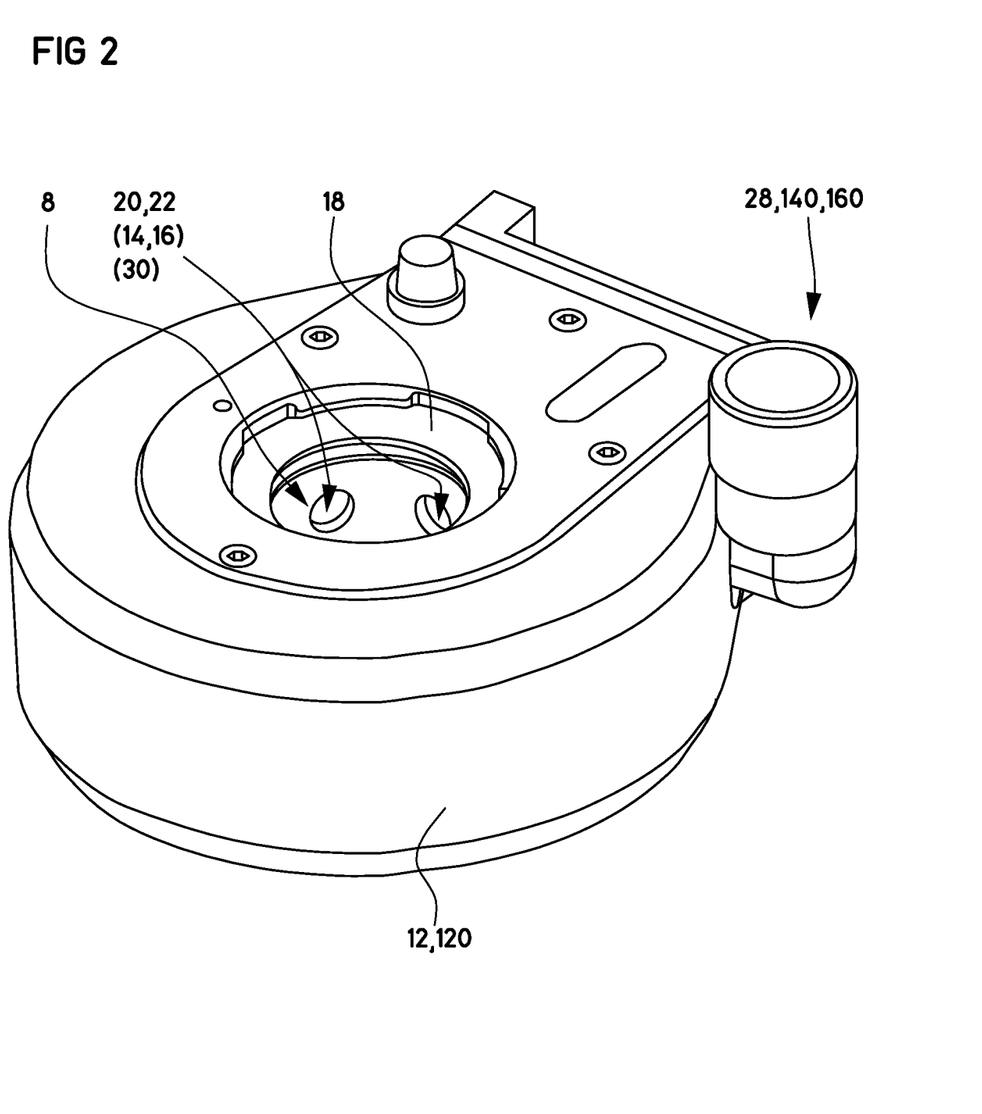
FIG. 2 is a perspective view of the induction coil arrangement of the shrinkage appliance as per FIG. 1.
Figure 3:
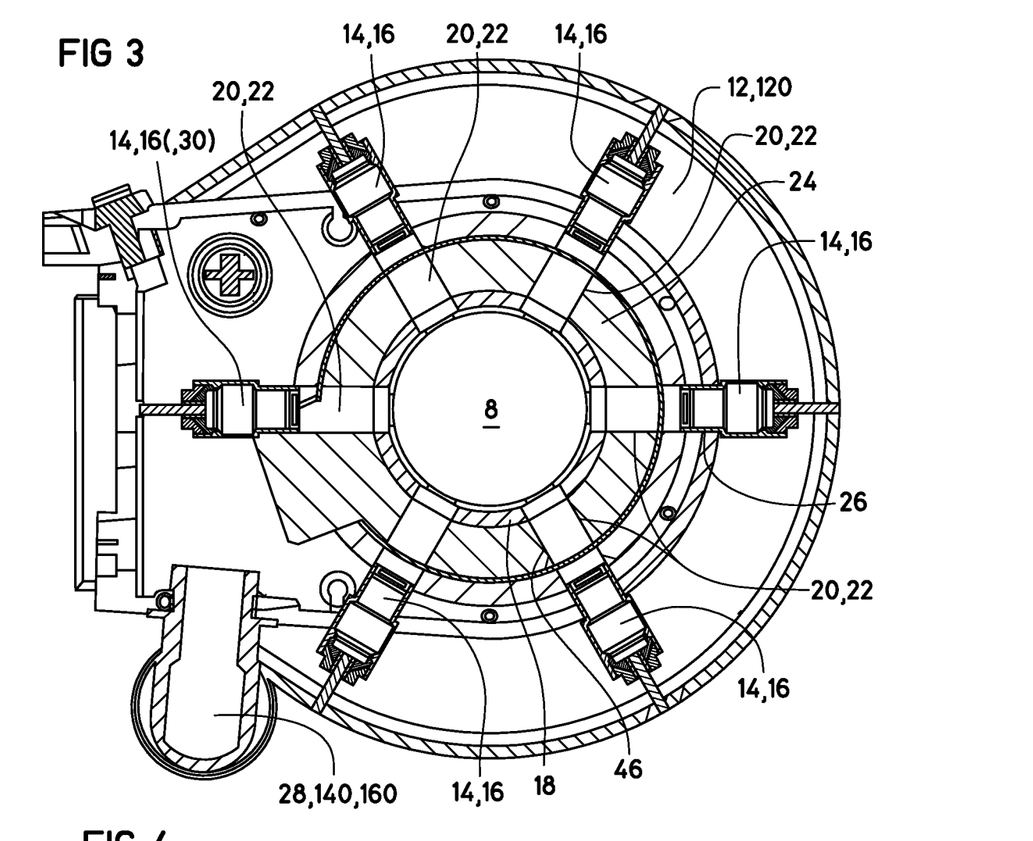
FIG. 3 is a radial sectional-view through the induction coil arrangement of the shrinkage appliance as per FIG. 1.
Figure 4:
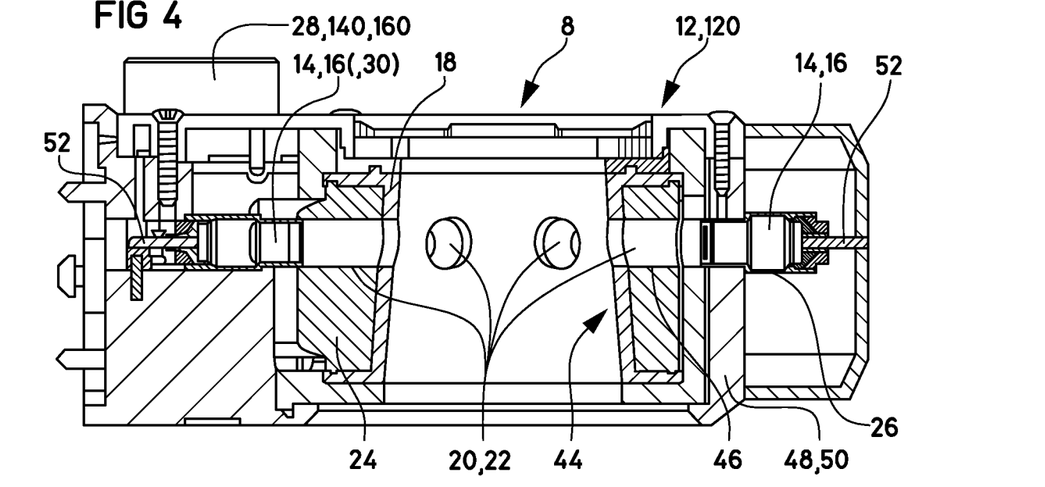
FIG. 4 is an axial-sectional view through the induction coil arrangement of the shrinkage appliance as per FIG. 1.

FIGS. 2 to 4 show the induction coil arrangement 12 in detail in different illustrations/sections.

As shown in FIG. 1, for the purposes of the shrink-fitting or shrinkage-based removal 120, the shrinkage appliance 2 has the induction coil arrangement 12, which is displaceable along its coil axis 10 and which serves for inductively heating 120 the shrink chuck 4 (compare in particular FIGS. 2 to 4), and a (schematically illustrated) control unit 28 for the process and heating control 160 for the shrink chuck 4.

The shrink chuck 4—illustrated in this case in FIG. 1—includes, as a sleeve section 32, a cylindrically hollow clamping region 34, which is accessible through a face opening 36 at the front face end 38 of the shrink chuck 4 for the insertion of the tool or miller shaft 40.

The clamping region 34 of the shrink chuck 4 has a somewhat smaller nominal diameter than the tool shaft 40, in such a way that the tool shaft can be fitted with clamping action in a manner known per se by (inductive) heating 120 of the shrink chuck 4. In the shrink-fitted state, the tool or miller shaft 40 is held rotationally conjointly by way of a frictional interference fit, for the transmission of a torque, on the front working section 42 of the rotary tool 6.

For the shrinkage-based removal, it is likewise the case that only the shrink chuck 4 is heated 120 at one side until the thermal expansion releases the tool or miller shaft 40 again for the removal thereof.

As shown in FIGS. 1 to 4, the induction coil arrangement 12 surrounds, concentrically about its coil axis 10, a receiving opening 8 for the shrink chuck 4.

Axial displacement of the induction coil arrangement 12—along its coil axis 10—causes the shrink chuck 4 to be brought into the desired warming/heating position in relation to the induction coil arrangement 12 (compare FIG. 1). For this purpose, it is also possible for stop elements, for example a pole disk, to be provided on the induction coil arrangement.

As can be seen in particular from FIGS. 1, 3 and 4, in order to generate an electromagnetic alternating field, the induction coil arrangement 12 includes a coil winding 24 in a coil housing 18.

In order to be able to detect the shell temperature of the shrink chuck 4 during the heating 120, multiple, in this case six, measurement channels 22, which each open into the receiving opening 8, extend through the induction coil arrangement 12 radially with respect to the coil axis 10.

In this case, the—six—measurement channels 22 are disposed, as shown in FIGS. 3 and 4, with approximately uniform pitch about the coil axis 10, at the same axial height with respect to the coil axis 10 in an axial central region 44 of the induction coil arrangement 12, between the axial ends thereof, wherein the coil winding 24 is wound around the six measurement channels 22 so as to leave these free. The coil-side inner section 46 of the respective measurement channel 22 is aligned with a recess 26 in the outer wall 48 of the induction coil housing 50 (and thus also with a total of six recesses in the outer wall 48 of the induction coil housing 50).

Into each of the—six—recesses 26 of the induction coil housing 50, there is inserted in each case one temperature sensor 16 which performs measurement contactlessly and which is in this case a radiation detector 16 or pyrometer 16 which (contactlessly) measures thermal radiation, which temperature sensor, through "its respective" measurement channel 22 in the coil winding 24, detects thermal radiation emitted by the shrink chuck 4.

The control unit 28 is coupled at an input side to the temperature sensors 16 by cables 52—and thus receives the measurement signals from the temperature sensors, which measurement signals are processed 140 jointly in the control unit 28 to obtain a resulting shell/surface temperature of the shrink chuck 4 that is to be measured. In a first, simple approach, this is performed for example by calculation of an average value. If, for example, the ascertained resulting shell/surface temperature of the shrink chuck that is to be measured exceeds a specified setpoint temperature, the heating power of the induction coil arrangement is reduced 160.

In this way, during the heating 120 of the shrink chuck 4, temperature control can be performed on the basis of the ascertained resulting shell temperature, for example by virtue of the electrical current supply to the induction coil arrangement being influenced 160, by using a control unit 28, in a manner dependent on the resulting shell temperature.

Shrinkage Appliance with Contactless Temperature Measurement by Using a Quotient Pyrometer (Compare FIGS. 1 to 4)

FIGS. 1 to 4 also show—as a modification indicated by the reference designation 30 (between parentheses), a "quotient pyrometer"—an alternative shrinkage appliance 2 for the shrink-fitting or shrinkage-based removal 120 of shaft-type tools 6 or (as shown) of a milling tool 6 into or from a shrink chuck 4 with—in this modified case—an induction coil arrangement 12 equipped with a quotient pyrometer 30.

This embodiment of the alternative shrinkage appliance differs from the previous embodiment solely in that, as shown in FIGS. 1 to 4, instead of the six temperature sensors/radiation detectors 16 which are seated in/at the six measurement channels 22 and perform measurement through them, a single quotient pyrometer 30 is used, which is disposed correspondingly in/at one of the measurement channels 22. The resulting shell/surface temperature is thus obtained in this case solely from the measurement by using quotient pyrometer 30.

All of the previous statements relating to the shrinkage appliance 2 apply in this case correspondingly, and do not need to be repeated.

Shrinkage Appliance with Cooling Appliance with Contactless Temperature Measurement (FIGS. 5 to 8)

Figure 5:
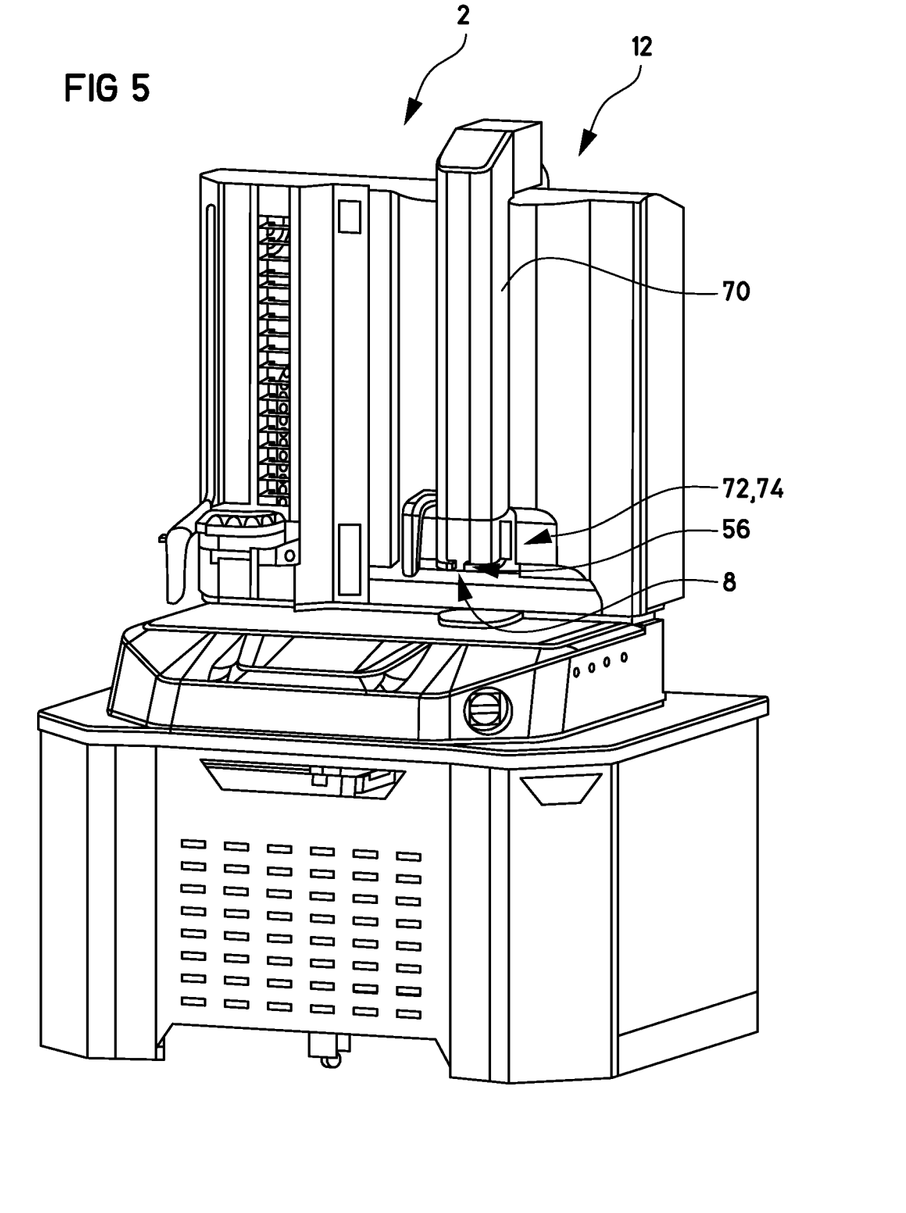
FIG. 5 is a perspective view of a shrinkage appliance with a cooling appliance, and with a measuring ring integrated into the cooling appliance, according to an embodiment.
Figure 6:
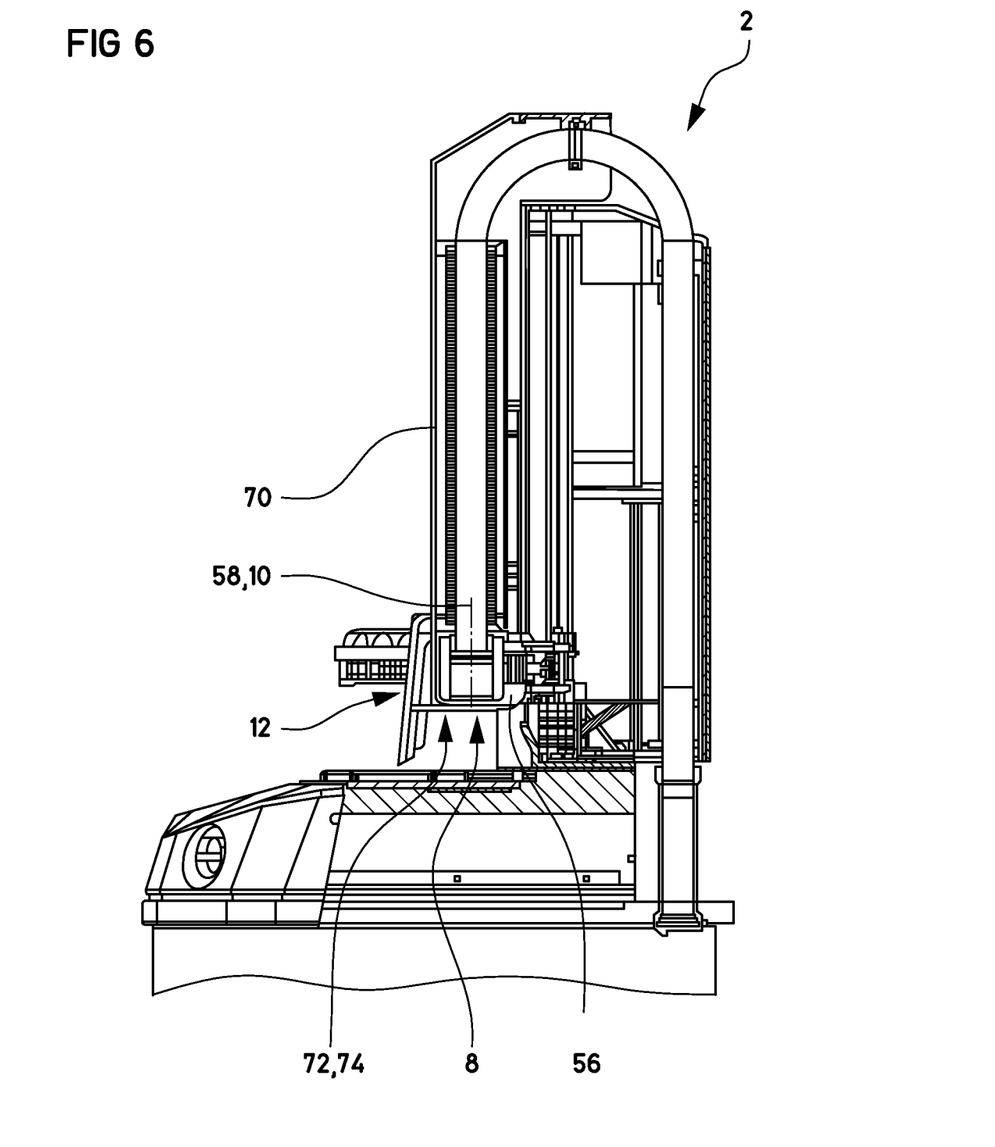
FIG. 6 is a side-elevational view of the shrinkage appliance with the cooling appliance, and with the measuring ring integrated into the cooling appliance, as per FIG. 5, illustrated from one side.

FIGS. 5 and 6 show a shrinkage appliance 2 with a cooling appliance 12, as presented and described in detail in European Application EP 3 444 064 A1 (see FIGS. 1 and 4 and paragraphs [0014] to [0026] of European Application EP 3 444 064 A1), corresponding to U.S. Pat. No. 11,141, 797, the content of which is hereby incorporated (reference document) into this application.

As presented by FIG. 5 (compare also FIG. 4 of European Application EP 3 444 064 A1, corresponding to U.S. Pat. No. 11,141,797 (reference document)) and FIG. 6 (compare also FIG. 1 of European Application EP 3 444 064 A1, corresponding to U.S. Pat. No. 11,141,797 (reference document))), the cooling appliance 12 has a cooling head 72 which is guided displaceably on a frame or stand 70 and which includes at least one cooling attachment 74 that can be mounted onto that part of the shrink chuck 4 which is to be cooled. The cooling attachment 74 includes a receiving opening 8 (compare passage opening 6 in European Application EP 3 444 064 A1, corresponding to U.S. Pat. No. 11,141,797), the inner contour/diameter of which is adapted to the outer contour/diameter of that part of the shrink chuck 4 (not illustrated) which is to be cooled (in such a way that it is possible for the cooling attachment 74 to be pushed/ mounted onto a shrink chuck 4 that is to be cooled).

For further details relating to the shrinkage appliance 2 and the cooling appliance 12 thereof, reference is made to European Application EP 3 444 064 A1, corresponding to U.S. Pat. No. 11,141,797 (see FIGS. 1 and 4 and paragraphs [0014] to [0026] of European Application EP 3 444 064 A1, corresponding to U.S. Pat. No. 11,141,797)).

Figure 7:
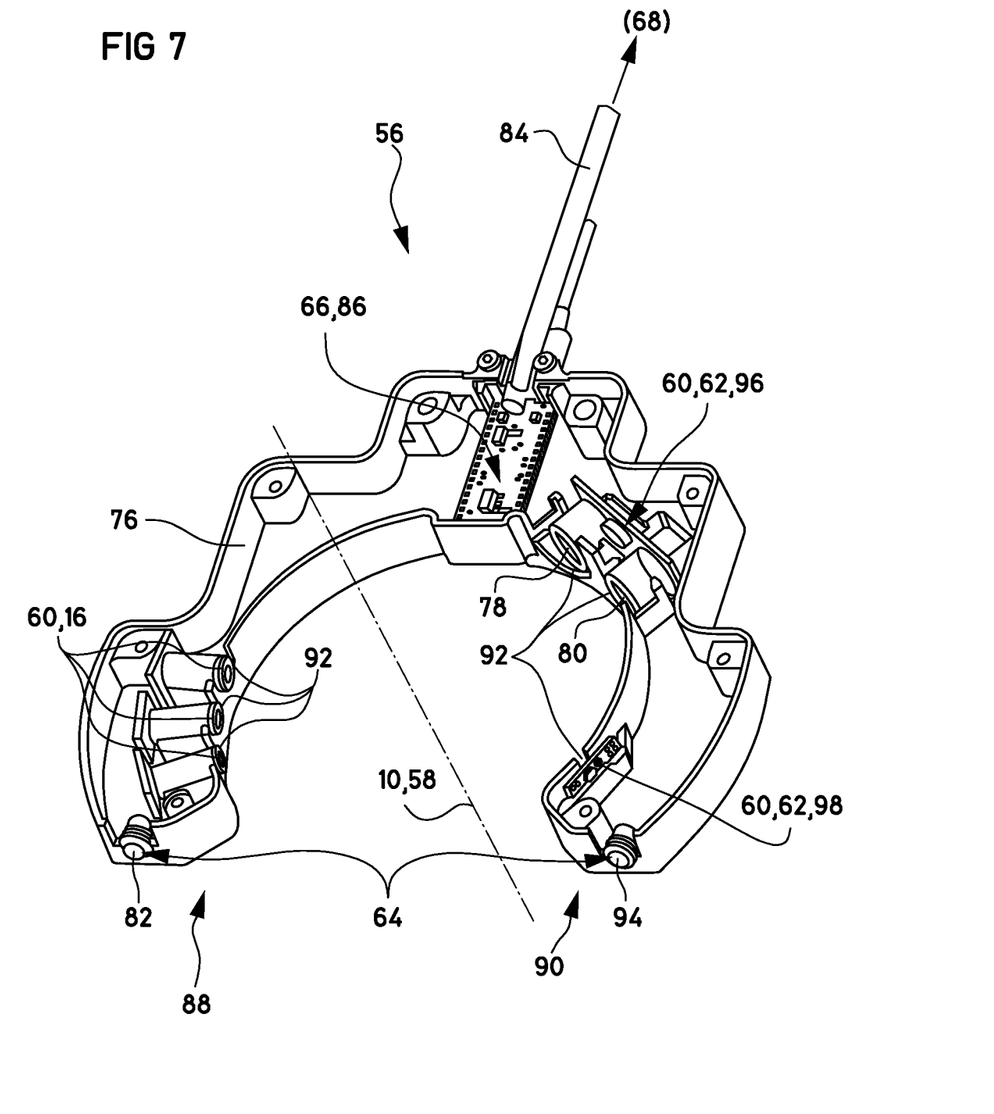
FIG. 7 is a perspective view of the measuring ring of the shrinkage appliance as per FIG. 5.
Figure 9A:
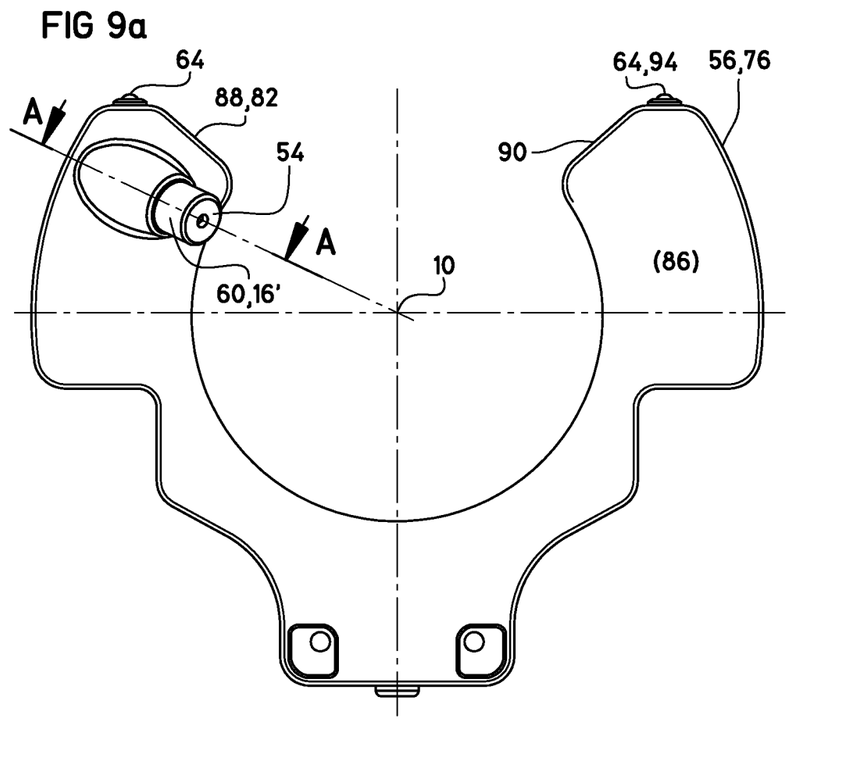
FIGS. 9a and 9b are respective plan and sectional views of a further measuring ring.
Figure 9B:
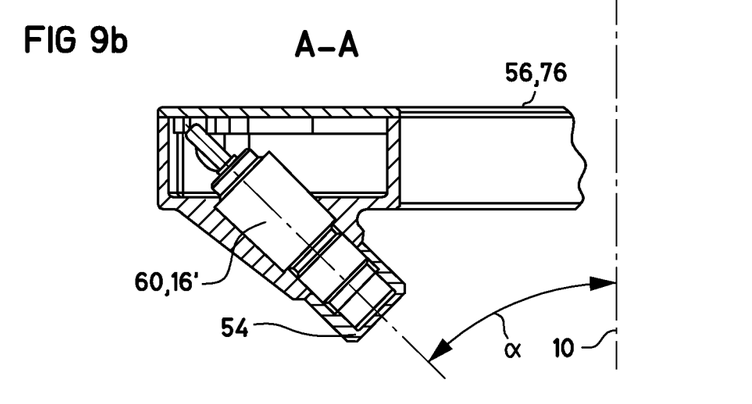

As is also shown in FIGS. 5 and 6, a measuring or sensor ring 56 (which is open over a particular circular ring sector) (compare FIG. 7 (an alternative sensor ring is shown in FIGS. 9a and 9b)) is integrated into the cooling attachment 74, through the use of which measuring or sensor ring the shell temperature of a shrink chuck 4 that is received in the cooling attachment 74 or the receiving opening 8 thereof can be—contactlessly—measured. The integration is such that, at the lower edge of the cooling attachment 74, the measuring ring 56 (compare FIG. 7) is disposed coaxially (with its central axis 58) with respect to the central axis 10 of the cooling head 72 or cooling attachment 74.

In this case, the inner diameter of the measuring ring 56 is substantially equal to that of the cooling attachment 74 (at the lower end thereof), whereby the measuring ring is thus part of the receiving opening 8.

FIG. 7 shows the measuring ring 56 in detail in a state in which it has been cut open "at the top," allowing a view into a housing 76 of the measuring ring 56.

As illustrated in FIG. 7, the measuring ring 56 is a nearly-closed ring-shaped body, with two ring limbs 88, 90 that are situated opposite one another at its open sector.

As is also shown in FIG. 7, in the measuring ring housing 76 that forms the body of the measuring ring 56, there are received several sensors 60, 16, 62, 96, 98 of different types, specifically three mutually adjacent disposed infrared temperature sensors 16 in a left-hand limb 88 of the measuring ring 56 that is graphically illustrated in FIG. 7, and an ultrasound distance sensor 60, 62, 96 including a transmitter 78 and a receiver 80, and a reflection sensor 60, 62, 98, in a right-hand limb 90 of the measuring ring 56 that is graphically illustrated in FIG. 7.

All of these sensors 60, 16, 62, 96, 98 are received in the measuring ring 56 or in the housing 76 thereof in such a way that their respective measuring direction is directed radially toward the central axis 58, 10. For this purpose, the measuring ring housing 76 also provides radially inner passages or openings 92 at which the sensors 60, 16, 62, 96, 98 are disposed and through which the sensors can perform measurement in a radially inward direction.

In an embodiment that is not illustrated, the sensors 60, 16, 62, 96, 98 may also be oriented substantially perpendicularly with respect to the outer shell of the shrink chuck 4, which in many cases is of conical shape.

Through the use of lines (not illustrated), the sensors 60, 16, 62, 96, 98 are connected to a microcontroller 86 (processing unit 66) that is likewise received in the measuring ring 56 or in the housing 76 thereof, in such a way that measurement signals from the sensors 60, 16, 62, 96, 98 are supplied to the microcontroller for processing, in this case in particular for the purposes of ascertaining 140 a resulting shell temperature of a shrink chuck 4 that is received in the cooling attachment 74.

The microcontroller 86 in turn is connected through a feed line 84 to a control unit 68, or for short a controller 68, of the cooling appliance 12, to which the microcontroller transmits its signals such as the resulting shell temperature. The controller 68 can then control 160 a cooling operation 120 (of a shrink chuck 4 that is received in the cooling attachment 74) in a manner dependent on presently ascertained shell temperatures.

As is also shown in FIG. 7, the measuring ring 56 provides an LED (thermal) status indicator 64 in the form of two colored LEDs (light-emitting diodes) 82, 94, which are disposed at the face sides of the two limbs 88, 90 and which are thus visible to a user and of which one is red 82 and the other is green 94 and which, being likewise connected through the microcontroller 86 to the controller 68, are also controlled by using the controller 68.

An—illuminated—green LED (light-emitting diode) 94 indicates a thermal state of a shrink chuck 4 that has for example cooled to such an extent that it can be safely touched using a bare hand; an—illuminated—red LED (light-emitting diode) 82 indicates a thermal state of a shrink chuck 4 that has not yet (sufficiently) cooled down. Red flashing of the red LED (light-emitting diode) 82 indicates an active cooling operation by using the cooling arrangement 12.

Figure 8:
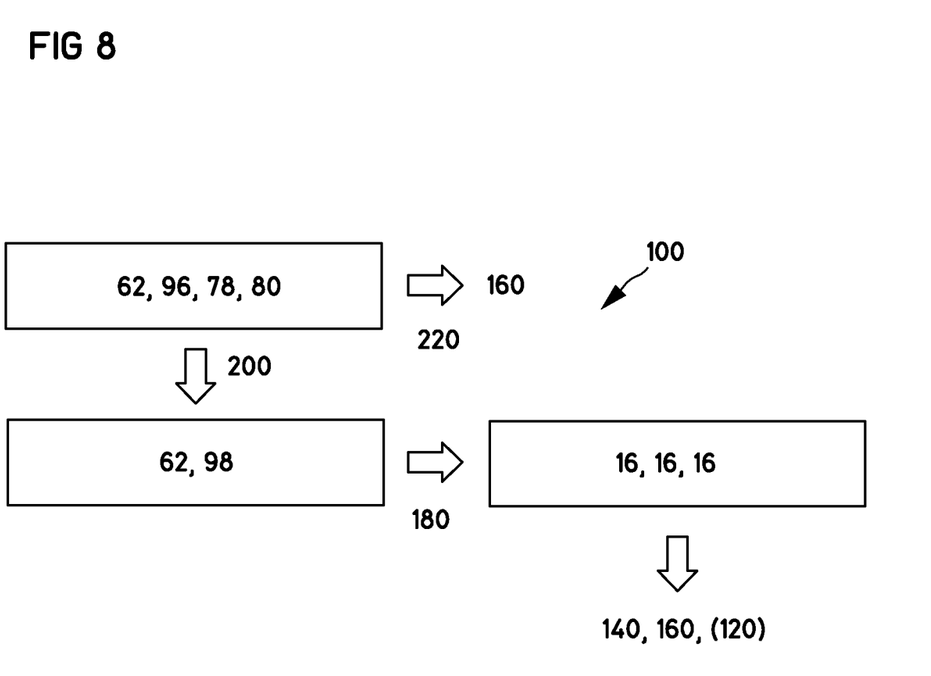
FIG. 8 is a block diagram illustrating the functioning of the measuring ring of the shrinkage appliance as per FIG. 5.

FIG. 8 illustrates the functioning 100 or the interaction 200 of the various sensors 60, 16, 62, 96, 98, during the measurements performed thereby or during the ascertainment 140 of the shell/surface temperature of a shrink chuck 4 which is to be cooled by cooling, or which is received in the cooling attachment 74, and control 160.

The measuring ring 56 or the sensors 60, 16, 62, 96, 98 thereof (and light-emitting diodes 82, 94) are active or are switched into an active state (1) as soon as the cooling attachment 74—with integrated measuring ring 56—is moved downward from above over the shrink chuck 4 that is to be cooled, (2) during the cooling operation 120, in which the shrink chuck 4 is received in the cooling attachment 74 (and is cooled (in a manner controlled by using the controller 68 (note: the controller 68 sets the cooling parameters, such as a cooling duration etc., optionally using the ascertained surface temperature or surface color of a shrink chuck 4))) and (3) until the cooling attachment 74 with integrated measuring ring 56 has been lifted off—pushed upward from—the shrink chuck 4 (altogether referred to for example as "measuring phase"/"measuring cycle").

The start and the end of the measurements or of the measuring phase ((1) to (3)) may be ascertained (automatically) by using the (ultrasound) distance sensor 62, 96 or 78/80, which detects 220—by distance measurement—whether a shrink chuck 4 is situated in the measuring ring 56.

During the temperature measurement or temperature ascertainment 140 (which is performed by the microcontroller 86), the surface or the surface color of the shrink chuck 4 that is received in the measuring ring 56 is then ascertained (200) by using the reflection sensor 62, 98 using the distance values ascertained by using the distance sensor 62, 96, 78, 80. That is to say, in this case, specifically whether or not the shrink chuck 4 has a black surface.

On the basis of this information, those infrared temperature sensors 16—of the three infrared temperature sensors 16 that are received in the measuring ring 56—which have been (pre-)set/calibrated for the present surface of the shrink chuck 4 that is (presently) received in the measuring ring 56 ("black"/"not black" or "silver," "white") are selected 180 for the temperature ascertainment/calculation 140.

In this case, in the case of the measuring ring 56, a first of the three infrared temperature sensors 16 is set/calibrated for a black surface ("black temperature sensor"), whereas the other two infrared temperature sensors 16 are set/calibrated for non-black surfaces, for example silver and white ("non-black temperature sensors").

If, by using the reflection sensor 62, 98, a "black" shrink chuck 4 is detected in the measuring ring 56, then the temperature ascertainment 140 is performed using the single "black" infrared temperature sensor 16; if a "non-black" shrink chuck 4 is detected in the measuring ring 56, then the temperature ascertainment 140 is performed using the two other, "non-black" temperature sensors 16, for example by calculation of an average value from the values of the two "non-black" temperature sensors 16, 16.

The control 160 of the cooling 120 is then performed on the basis of the thus ascertained surface/shell temperatures of a shrink chuck 4 that is situated in the measuring ring 56, and the LED (thermal) status indicator light-emitting diodes 82, 94 and 64 are actuated 160 correspondingly to the ascertained surface/shell temperatures.

Specifically, the light-emitting diodes may be controlled in this case in such a way that, (1) if the cooling attachment 74 is firstly pushed with the measuring ring 56 over the (hot) shrink chuck 4 that is to be cooled, the red light-emitting diode 82—illuminated red—indicates the hot state of the shrink chuck 4 or of the surface/shell thereof.

When the cooling attachment 74 has then been pushed fully over the shrink chuck 4 and the cooling operation 120 is started (2), the red light-emitting diode 82 flashes during the cooling operation 120 and indicates the "cooling" 120.

When the cooling operation 120 has ended and the cooling attachment 74 has been raised (3), then the red light-emitting diode 82 illuminates if the shrink chuck 4 is still too hot, and the green light-emitting diode 94 illuminates if the shrink chuck 4 has cooled down sufficiently. If the light-emitting diode 82, illuminated red, still indicates that the shrink chuck 4 is too hot, then the cooling attachment 74 can be pushed down over the shrink chuck 4 again and a further cooling operation 120 can be performed.

It is optionally also possible for the entire cooling operation 120 to be automatically coupled to the temperature ascertainment 140 and controlled 160 through the use thereof.

It would furthermore also be possible for not just the selection of the (preset) infrared temperature sensors 16 to be made on the basis of the reflection measurement (98) but also for the setting of one or more of the infrared temperature sensors 16 to be performed on the basis of a present reflection measurement (98). The one or more infrared temperature sensors 16 that are then (presently) set in this way can then be used for the temperature ascertainment 140 of the shell/surface temperature of the shrink chuck 4. It is optionally also possible to omit a "correction" of the reflection measurement (98) by using the distance sensor (96, 78, 80).

It is additionally also pointed out that a measuring ring 56 corresponding to the above-described measuring ring 56 may also be disposed at an induction coil arrangement 12 of a/the shrinkage appliance 2 in order, there, to measure the shell temperatures of shrink chucks 4 disposed in the receiving opening 8 of the induction coil arrangement 12 (compare FIGS. 1 to 4). It is correspondingly also possible for a measuring ring 56 corresponding to the above-described measuring ring 56 to be disposed at independent or individually operating, separate cooling appliances 12.

FIGS. 9*a* and 9*b* show an alternative measuring ring 56 (which is usable or used in the same way with regard to its functioning) which can be integrated into the cooling attachment 74, with FIG. 9*a* showing the measuring ring in its entirety and FIG. 9*b* showing the measuring ring in a detail in a state in which it has been cut open "at the top."

As illustrated in FIG. 9*a*, this measuring ring 56 is also a nearly-closed ring-shaped body, with two ring limbs 88, 90 that are situated opposite one another at its open sector.

As is also shown in FIG. 9*a* (and FIG. 9*b* in the detail), in the measuring ring housing 76 that forms the body of the measuring ring 56, there is received a single temperature sensor 60, specifically an infrared temperature sensor 16' in a left-hand limb 88 of the measuring ring 56 that is diagrammatically illustrated in FIG. 9*a*.

Irrespective of this, it is also possible for holding devices other than the measuring ring 56 to be provided for the temperature sensor 16'.

The temperature sensor 60 or 16' is equipped with an aperture 54.

By contrast to the measuring ring 56 described above (according to FIG. 7), this temperature sensor 60 or 16' is in this case received in the measuring ring housing 76 so as to be inclined with respect to the central axis 10 by an angle α of approximately 45°.

Through the use of lines (not illustrated), the temperature sensor 60 or 16' is connected to a microcontroller 86 (processing unit 66, not visible) that is likewise received in the measuring ring 56 or in the housing 76 thereof, in such a way that measurement signals from the temperature sensor 60 or 16' are supplied to the microcontroller for processing, in this case in particular for the purposes of ascertaining 140 the shell temperature of a shrink chuck 4 that is received in the cooling attachment 74.

The microcontroller 86 in turn is connected (in a manner which is not visible) through a feed line 84 to a control unit 68, or for short a controller 68, of the cooling appliance 12, to which the microcontroller transmits its signals such as the shell temperature.

The controller 68 can then control 160 a cooling operation 120 (of a shrink chuck 4 that is received in the cooling attachment 74) in a manner dependent on the present shell temperatures.

As is also shown in FIG. 9a, the measuring ring 56 provides an LED (thermal) status indicator 64 in the form of two colored LEDs (light-emitting diodes) 82, 94, which are disposed at the face sides of the two limbs 88, 90 and which are thus visible to a user and of which one is red 82 and the other is green 94 and which, being likewise connected through the microcontroller 86 to the controller 68, are also controlled by using the controller 68.

An—illuminated—green LED (light-emitting diode) 94 indicates a thermal state of a shrink chuck 4 that has for example cooled to such an extent that it can be safely touched using a bare hand; an—illuminated—red LED (light-emitting diode) 82 indicates a thermal state of a shrink chuck 4 that has not yet (sufficiently) cooled down. Red flashing of the red LED (light-emitting diode) 82 indicates an active cooling operation by using the cooling arrangement 12.

Even though the invention has been illustrated and described in more detail by way of the preferred exemplary embodiments, the invention is not restricted by the disclosed examples, and other variations may be derived from them without departing from the scope of protection of the invention.

The following is a summary list of reference numerals and the corresponding structure used in the above description of the invention:

2 Appliance for a heat treatment, shrinkage appliance, cooling appliance, shrinkage appliance with cooling appliance
4 Shrink chuck
6 Shaft-type/rotary tool, miller/milling tool
8 Receiving device, receiving opening
10 Central axis, coil axis
12 Heat treatment unit, induction coil arrangement, cooling appliance/unit
14 Measuring unit
16, 16' Temperature sensor, pyrometer with radiation detector, radiation detector
18 (Coil) housing
20 Recesses
22 Measurement channel
24 Coil winding
26 Through recess
28 Control unit
30 Quotient pyrometer
32 Sleeve section
34 Clamping region
36 Face opening
38 Front face end
40 Tool shaft, miller shaft
42 Front working section
44 Axial central region
46 Coil-side inner section
48 Outer wall
50 Induction coil housing
52 Cable
54 Focusing device, shielding device, aperture
56 (Annular) structural unit, measuring/sensor ring
58 Central axis of the (annular) structural unit/measuring ring
60 Sensor
62 Second sensor of different type, distance sensor, optical (distance) sensor, ultrasound sensor, laser sensor, (infrared) reflection sensor
64 Display device, (LED) (heat) status indicator
66 Processing unit
68 Controller, control unit
70 Stand
72 Cooling head
74 Cooling attachment
76 (Measuring ring) housing
78 Transmitter
80 Receiver
82 (Red) light-emitting diode
84 Feed line
86 Microcontroller
88 (Left) limb
90 (Right) limb
92 Passage, recess
94 (Green) light-emitting diode
96 (Ultrasound) distance sensor
98 Reflection sensor
100 Method
120 Heat treatment, heating, shrinkage-based insertion/removal, cooling
140 Ascertainment of a resulting shell/surface temperature
160 Control of the heat treatment, control of the heating/of the cooling, control of the heating power or the electrical current supply
180 Performing of calibration/setting or adjustment at at least one (first) temperature sensor (16) using the second sensor (62) of different type, interaction of the at least one (first) temperature sensor (16) with the second sensor (62) of different type
200 Interaction of a first second sensor (62) of different type with a second second sensor (62) of different type
220 Detection of a shrink chuck (4) received in the receiving device (8) using a second sensor of different type

The invention claimed is:

1. An appliance for heat treatment or inductive heating or cooling of shrink chucks for shaft-shaped tools or a shrinkage appliance or a cooling appliance or a shrinkage appliance with a cooling appliance, the appliance comprising:
a receiving device or a receiving opening for receiving the shrink chuck;
a heat treatment unit or an induction coil arrangement or a cooling unit surrounding said receiving device relative to a central axis; and
a measuring unit for contactless temperature measurement of the shrink chuck;

said measuring unit having a plurality of sensors disposed around said receiving device, said plurality of sensors including at least one first sensor being a temperature sensor for contactless detection of a shell temperature of the shrink chuck disposed in said receiving device, and at least one second sensor being a sensor of a type different than said first sensor for detection of another property of the shrink chuck disposed in said receiving device, said sensors being disposed in at least one of circular form or at different axial heights relative to said central axis at or around said receiving device.

2. The appliance according to claim 1, wherein said heat treatment unit concentrically surrounds said receiving device, said measuring unit is configured for contactless temperature measurement of the shrink chuck, and said first sensor is configured for contactless detection of the shell temperature of the shrink chuck.

3. The appliance according to claim 1, wherein said at least one second sensor is a distance sensor or an optical sensor or an ultrasound sensor or a laser sensor or a reflection sensor or an infrared reflection sensor.

4. The appliance according to claim 1, wherein said at least one second sensor is a distance sensor configured for contactless measurement.

5. The appliance according to claim 1, wherein said at least one first temperature sensor is configured as a radiation detector or as a pyrometer with a radiation detector for detecting thermal radiation from the shrink chuck disposed in said receiving device.

6. The appliance according to claim 1, wherein at least one of a plurality of first temperature sensors or a plurality of second sensors are disposed around said receiving device.

7. The appliance according to claim 1, wherein at least two or a plurality or all of said first temperature sensors have different configurations or measurement settings.

8. The appliance according to claim 1, wherein at least one of said heat treatment unit or a housing of said heat treatment unit has at least one or more recesses, and a respective one of said sensors is disposed at, or is disposed in, at least one of said recesses.

9. The appliance according to claim 8, wherein one of said recesses is configured as a measurement channel running through at least one of said heat treatment unit or said housing of said heat treatment unit.

10. The appliance according to claim 9, wherein said measurement channel runs substantially radially relative to said central axis.

11. The appliance according to claim 9, wherein said heat treatment unit is configured as an induction coil arrangement and has at least one of:
a coil winding wound so as to leave said measurement channel or a plurality of measurement channels free, or induction coil arrangements and said measurement channel or said measurement channels being formed between said induction coil arrangements.

12. The appliance according to claim 9, wherein at least one of said sensors is disposed at least partially in or at said measurement channel or performs measurement through said measurement channel or each of said sensors is disposed at least partially in or at a respective measurement channel or performs measurement through said respective measurement channel.

13. The appliance according to claim 9, which further comprises a protective window inserted into said measurement channel.

14. The appliance according to claim 13, wherein said protective window is exchangeable, permeable to thermal radiation and configured for protecting said sensor against at least one of contamination or damage.

15. The appliance according to claim 1, which further comprises a processing unit or microcontroller for ascertaining a resulting shell temperature of the shrink chuck disposed in said receiving device, said processing unit or microcontroller being configured to use said sensors or a multiplicity of said sensors for ascertaining the resulting shell temperature of the shrink chuck disposed in said receiving device.

16. The appliance according to claim 15, wherein said heat treatment unit or induction coil arrangement or cooling unit has a controller configured to control a power of said heat treatment unit or an electrical current supply to said heat treatment unit or induction coil arrangement in dependence on the resulting shell temperature.

17. The appliance according to claim 1, which further comprises a display device for displaying a thermal state.

18. The appliance according to claim 17, wherein the thermal state is a thermal state of a tool receptacle or the shrink chuck disposed in said receiving device.

19. An appliance for heat treatment or inductive heating or cooling of shrink chucks for shaft-shaped tools or a shrinkage appliance or a cooling appliance or a shrinkage appliance with a cooling appliance, the appliance comprising:
a receiving device or a receiving opening for receiving the shrink chuck;
a heat treatment unit or an induction coil arrangement or a cooling unit surrounding said receiving device relative to a central axis;
a measuring unit for contactless temperature measurement of the shrink chuck;
said measuring unit having a plurality of sensors disposed around said receiving device, said plurality of sensors including at least one first sensor being a temperature sensor for contactless detection of a shell temperature of the shrink chuck disposed in said receiving device, and at least one second sensor being a sensor of a type different than said first sensor for detection of another property of the shrink chuck disposed in said receiving device; and
a substantially ring-shaped structural unit, said sensors being disposed in said substantially ring-shaped structural unit at least one of substantially circularly about a central axis of said substantially ring-shaped structural unit at different axial heights or at an identical axial height relative to said central axis of said substantially ring-shaped structural unit.

20. The appliance according to claim 19, wherein said substantially ring-shaped structural unit is disposed coaxially relative to said central axis in the appliance or axially adjacent said heat treatment unit or said induction coil arrangement or cooling unit.

21. The appliance according to claim 19, wherein said sensors disposed in said substantially ring-shaped structural unit are sensors of an identical type.

* * * * *